United States Patent
Kim (10) Patent No.: US 10,759,405 B2
(45) Date of Patent: Sep. 1, 2020

(54) SYSTEM AND METHOD FOR CONTROLLING KICK-BACK IN ELECTRIC BOOSTER TYPE BRAKE SYSTEM

(71) Applicants: Hyundai Motor Company, Seoul (KR); KIA Motors Corporation, Seoul (KR)

(72) Inventor: Joo Beom Kim, Gyeongsangbuk-do (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/194,702

(22) Filed: Nov. 19, 2018

(65) Prior Publication Data
US 2020/0108813 A1 Apr. 9, 2020

(30) Foreign Application Priority Data

Oct. 5, 2018 (KR) .................. 10-2018-0118639

(51) Int. Cl.
| | |
|---|---|
| B60T 8/42 | (2006.01) |
| B60T 8/32 | (2006.01) |
| B60T 13/74 | (2006.01) |
| B60T 15/36 | (2006.01) |
| B60T 13/14 | (2006.01) |

(52) U.S. Cl.
CPC ............ B60T 8/4291 (2013.01); B60T 8/329 (2013.01); B60T 13/142 (2013.01); B60T 13/745 (2013.01); B60T 15/36 (2013.01); B60T 2220/04 (2013.01)

(58) Field of Classification Search
CPC . B60T 13/10; B60T 13/16; B60T 8/36; B60T 8/40; B60T 8/42
USPC ....... 303/10, 15, 20, 87, 116.1–116.4, 119.1, 303/119.2, 113.2, 113.5, 114.1–114.3
See application file for complete search history.

(56) References Cited

U.S. PATENT DOCUMENTS

| | | | | |
|---|---|---|---|---|
| 6,264,287 | B1 * | 7/2001 | Sekihara | B60T 8/3275 303/10 |
| 6,592,192 | B1 * | 7/2003 | Kaneda | B60T 8/36 303/140 |
| 8,000,870 | B2 * | 8/2011 | Dessouki | B60T 8/00 188/106 R |
| 8,770,673 | B2 * | 7/2014 | Wuerth | B60T 1/10 303/3 |
| 2018/0194353 | A1 * | 7/2018 | Kilmurray | B60W 30/18136 |

* cited by examiner

*Primary Examiner* — Christopher P Schwartz
(74) *Attorney, Agent, or Firm* — Brinks Gilson & Lione

(57) ABSTRACT

The present disclosure provides a system and a method for controlling kick-back in an electric booster type brake system capable of reducing a kick-back phenomenon in which a hitting force is transmitted to a brake pedal due to a difference between a high braking hydraulic pressure already generated in a power piston of a second master cylinder by driving a motor and a low braking hydraulic pressure generated in a first master cylinder when a driver steps on a brake pedal, in a fall back situation in which electric power is not smoothly supplied to the motor due to a low voltage of a battery.

10 Claims, 7 Drawing Sheets

SYSTEM AND METHOD FOR CONTROLLING KICK-BACK IN ELECTRIC BOOSTER TYPE BRAKE SYSTEM

CROSS-REFERENCE TO RELATED APPLICATION

This application claims priority to and the benefit of Korean Patent Application No. 10-2018-0118639, filed on Oct. 05, 2018, the entire contents of which are incorporated herein by reference.

FIELD

The present disclosure relates to a system and a method for controlling kick-back in an electric booster type brake system.

BACKGROUND

The statements in this section merely provide background information related to the present disclosure and may not constitute prior art.

An electric booster type brake system is referred to as a system which provides a simulated braking feeling for a brake pedal when a driver steps on the brake pedal and performs substantial braking by a motor driving force and a hydraulic pressure, instead of the existing booster which is a vacuum booster using an negative pressure of an engine.

The electric booster type brake system is mainly applied to a hybrid or electric vehicle which can not generate a vacuum degree according to the negative pressure of the engine, but tends to be applied even to a general internal combustion engine to cope with fast brake responsiveness and various electronic control additional functions.

The electric booster type brake system includes an electric motor for generating a braking force. When the electric power is not smoothly supplied to the motor, a kick-back phenomenon may occur due to a difference between a braking hydraulic pressure generated by driving of the motor and a hydraulic pressure generated when the driver steps on the brake pedal.

The kick-back phenomenon is a reaction force transmitted to the brake pedal when the driver steps on the brake pedal. Such a kick-back phenomenon may cause the driver to feel vibration, foreign body sensation, and anxiety during braking.

The above information disclosed in this section is only for enhancement of understanding of the background of the disclosure and therefore it may contain information that does not form the prior art that is already known to a person of ordinary skill in the art.

SUMMARY

The present disclosure provides a system and a method for controlling kick-back in an electric booster type brake system capable of minimizing or reducing a kick-back phenomenon in which a hitting force is transmitted to a brake pedal due to a difference between a high braking hydraulic pressure already generated in a power piston of a second master cylinder by driving a motor and a low braking hydraulic pressure generated in a first master cylinder when a driver steps on a brake pedal, in a fall back situation in which electric power is not smoothly supplied to the motor due to a low voltage of a battery.

In one aspect, the present disclosure provides a system for controlling kick-back in an electric booster type brake system, including: a pedal travel sensor sensing a pedal stroke of a brake pedal and transmitting the sensed pedal stroke to a controller; a battery controller transmitting current battery voltage information to the controller; a vehicle speed sensor transmitting the current vehicle speed information to the controller; a first pressure sensing sensor sensing a low hydraulic pressure generated in a first master cylinder; a second pressure sensing sensor sensing a high hydraulic pressure generated by driving of a power piston of a second master cylinder according to driving of a motor; and a controller preferentially performing a kick-back reduction mode if a battery voltage is equal to or lower a low-voltage reference value for a threshold time or longer and a current vehicle speed is equal to or lower than a low-speed reference value based on the battery voltage information and the vehicle speed information in a state in which the pedal stroke is sensed.

In another aspect, the present disclosure provides a method for controlling kick-back in an electric booster type brake system, including: sensing, by a pedal travel sensor, a pedal stroke of a brake pedal and transmitting the sensed pedal stroke to a controller; transmitting current battery voltage information from a battery controller to a controller; transmitting current vehicle speed information from a vehicle speed sensor to the controller; and preferentially performing, by the controller, a kick-back reduction mode if a battery voltage is equal to or lower a low-voltage reference value for a threshold time or longer and a current vehicle speed is equal to or lower than a low-speed reference value based on the battery voltage information and the vehicle speed information in a state in which the pedal stroke is sensed.

According to the present disclosure, if the battery voltage is equal to or lower than the low-voltage reference value for the threshold time or longer and the current vehicle speed is equal to or lower than the low-speed reference value, the hydraulic pressure (high braking hydraulic pressure generated in advance in the power piston of the second master cylinder) of the high-pressure portion is discharged to the oil reservoir in advance by performing the high kick-back reduction mode of the controller to reduce the difference between the oil pressure of the high-pressure portion and the oil pressure of the low-pressure portion, such that the braking can be easily made only by the oil pressure generated in the first master cylinder when the driver steps on the brake pedal and the kick-back phenomenon can be prevented from occurring or otherwise inhibited or reduced.

It is understood that the term "vehicle" or "vehicular," or other similar terms as used herein, is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

While the disclosure will be described in conjunction with examples, it will be understood that present description is not intended to limit the disclosure to those examples. On the contrary, the disclosure is intended to cover not only the examples, but also various alternatives, modifications, equivalents and other forms, which may be included within the spirit and scope of the disclosure.

First, a configuration and operation flow of an electric booster type brake system will be described in order to facilitate understanding of the present disclosure.

Figure 1:
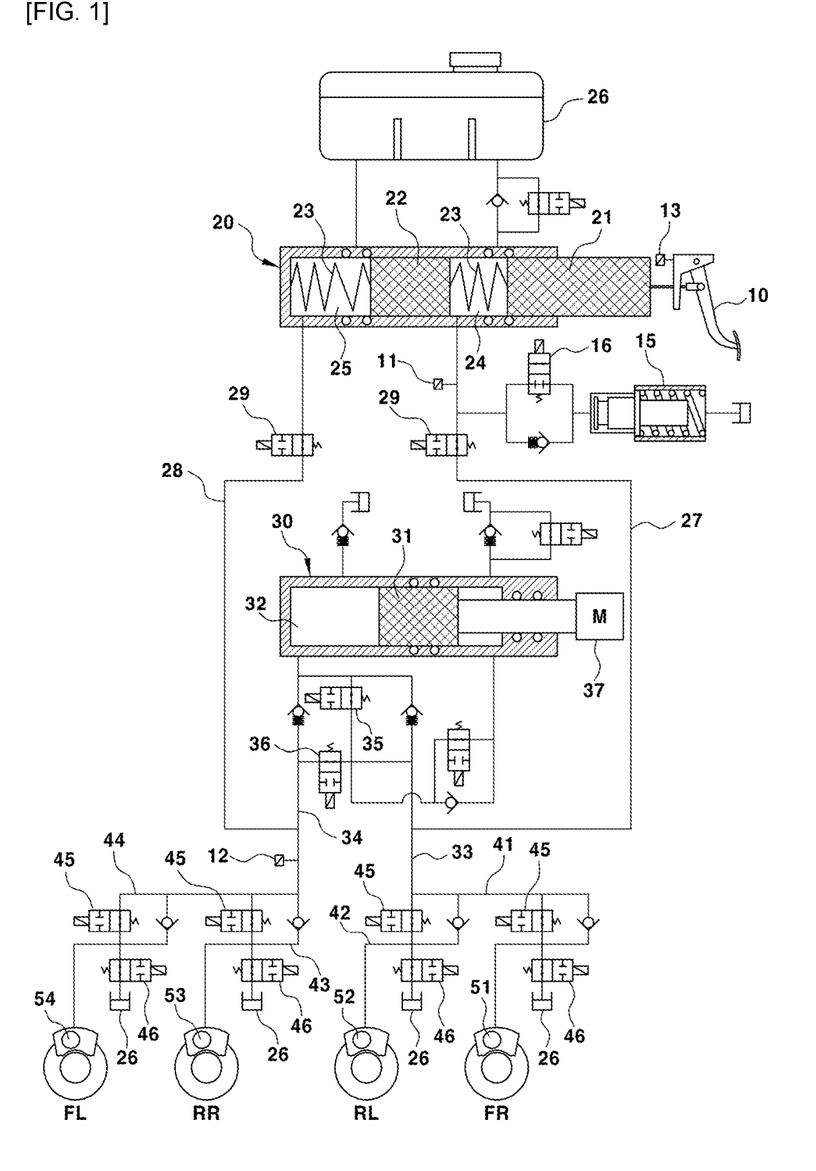
FIG. 1 is a diagram showing an electric booster type brake system, including a hydraulic circuit diagram in a state in which a driver does not step on a brake pedal.

FIG. 1 is a hydraulic circuit diagram showing an electric booster type brake system, and shows a state in which a driver does not step on a brake pedal.

A first master cylinder 20 is connected to a brake pedal 10.

A main piston 21 connected to the brake pedal 10 and a sub-piston 22 connected to the main piston 21 by a spring 23 and connected to an inner wall surface in front of the first master cylinder 20 by the spring 23 are embedded in the first master cylinder 23.

In the first master cylinder 20, the main piston 21 and the sub-piston 22 are partitioned from each other by a first hydraulic chamber 24 and the sub-piston 22 and the front inner wall surface of the front inner wall surface of the first master cylinder 20 are partitioned from each other by a second hydraulic chamber 25.

At this time, an oil reservoir 26 in which hydraulic oil for generating a hydraulic pressure is stored is connected to the first and second hydraulic chambers 24 and 25.

In addition, a pedal simulator 15 is connected to the first hydraulic chamber 24 with a normal close (NC) type simulator valve 16 interposed therebetween, and the pedal simulator 15 serves to provide a certain level of reaction force against the hydraulic pressure generated when a driver steps on a brake pedal and simulate braking feeling.

On the other hand, in the electric booster type brake system, the substantial braking hydraulic pressure is generated in the second master cylinder 30 operated by driving of a motor.

A power piston 31 for generating a braking hydraulic pressure is provided inside the second master cylinder 30 so as to be movable forward and backward, a hydraulic generation chamber 32 is partitioned in a space in front of the power piston 31, and the hydraulic generation chamber 32 is supplied with hydraulic oil for generating a hydraulic pressure by driving a pump embedded in the oil reservoir 26.

In particular, a motor 37 for providing a forward/backward movement force to the power piston 31 is connected to a rear end of the power piston 31.

In this case, the hydraulic generation chamber 32 of the second master cylinder 30 is connected to a first braking hydraulic supply line 33 and a second braking hydraulic supply line 33 for supplying the braking hydraulic pressure generated by the forward driving force of the power piston 31 during braking, In one aspect, the first braking hydraulic supply line 33 and the second braking hydraulic supply line 34 are provided with a normal close (NC) type relief valve 35 which makes a hydraulic pressure generated by the power piston 31 flow toward a wheel cylinder and a normal close (NC) type balancing valve 36 which is a predetermined flow control valve which synchronizes the first braking hydraulic supply line 33 and the second braking hydraulic supply line 34 to balance the hydraulic pressure flowing in the first braking hydraulic supply line 33 and the hydraulic pressure flowing in the second braking hydraulic supply line 34.

The relief valve 35 and the first braking hydraulic pressure supply line 33 are open by a control of a controller when the braking hydraulic pressure generated by the power piston 31 is applied to the wheel during the braking.

In addition, a first braking hydraulic pressure branching line 41 and a second braking hydraulic branch line 42 each connected to a wheel cylinder of a front right (FR) wheel and a wheel cylinder 52 of a rear left (RL) wheel are branched from a distal end of the first braking hydraulic supply line 33, and a third braking hydraulic branch line 43 and a fourth braking hydraulic branch line 44 each connected to a wheel cylinder 53 of a rear right (RR) wheel and a wheel cylinder 54 of a front left (FL) wheel are branched from a distal end of the second braking hydraulic supply line 34.

At this time, the first to fourth braking hydraulic branch lines 41, 42, 43 and 44 are provided with a normal open (NO) type wheel inlet valve 45 for transmitting a braking hydraulic pressure to each wheel cylinder and a normal close (NC) type wheel outlet valve 46 opened for discharging the hydraulic pressure of the wheel cylinder to the oil reservoir.

Compared with the fall back situation in which the power piston 31 does not smoothly generate the braking hydraulic pressure by the drive of the motor 37, to supply to the wheel the hydraulic pressure generated in the first master cylinder 20 when the driver steps on the brake pedal, a third braking hydraulic supply line 27 is connected between a first hydraulic chamber 24 of the first master cylinder 20 and the first braking hydraulic supply line 33 and a fourth braking hydraulic supply line 28 is connected between a second hydraulic chamber 25 of the first master cylinder 20 and the second braking hydraulic supply line 34.

At this time, the third braking hydraulic supply line 27 and the fourth braking hydraulic supply line 28 are each provided with a normal open (NO) type cut valve 29 for allowing and cutting off the flow of hydraulic pressure.

Meanwhile, a position adjacent to the brake pedal 10 is provided with a pedal travel sensor 13 (PTS) for sensing a stroke when the driver steps on the brake pedal, the third braking hydraulic supply line 27 or the fourth braking hydraulic supply line 28 are provided with first pressure sensing sensor 11 for sensing the hydraulic pressure generated in the first master cylinder 20 according to the operation of the brake pedal by the driver, and the first braking hydraulic supply line 33 or the second braking hydraulic supply line 34 is provided with the second pressure sensing sensor 12 for sensing the actual braking hydraulic pressure generated by the operation of the power piston 31.

Figure 5:
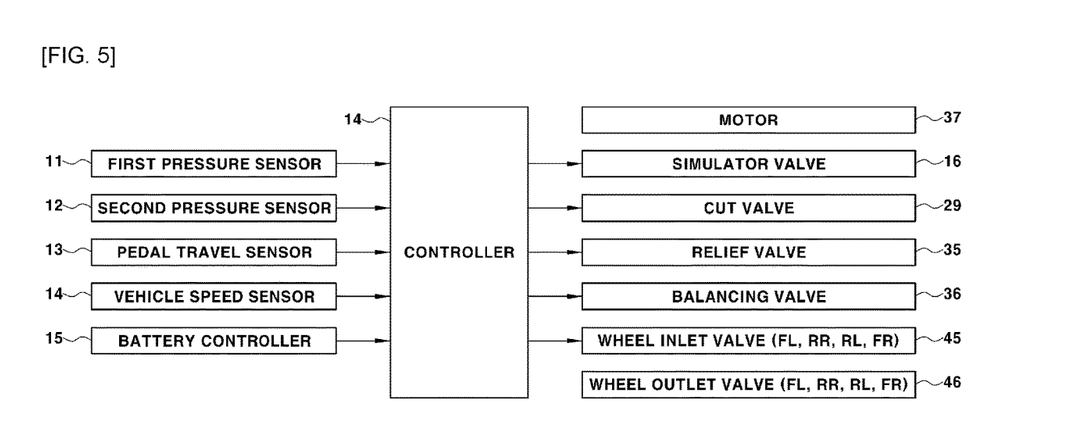
FIG. 5 is a control configuration diagram of the electric booster type brake system.

As shown in the control configuration diagram of FIG. 5, after the controller 14 receives sensing signals of the pedal travel sensor 13, the first pressure sensing sensor 11 and the second pressure sensing sensor 12, the motor 27, the relief valve 35 and the balancing valve 36, the wheel inlet valve 45, the wheel outlet valve 46, a simulator valve 16, a cut valve 29 and the like are controlled to be turned on/off based on the received sensing signals.

Hereinafter, an operation flow of the electric booster type brake system will be described.

Figure 2:
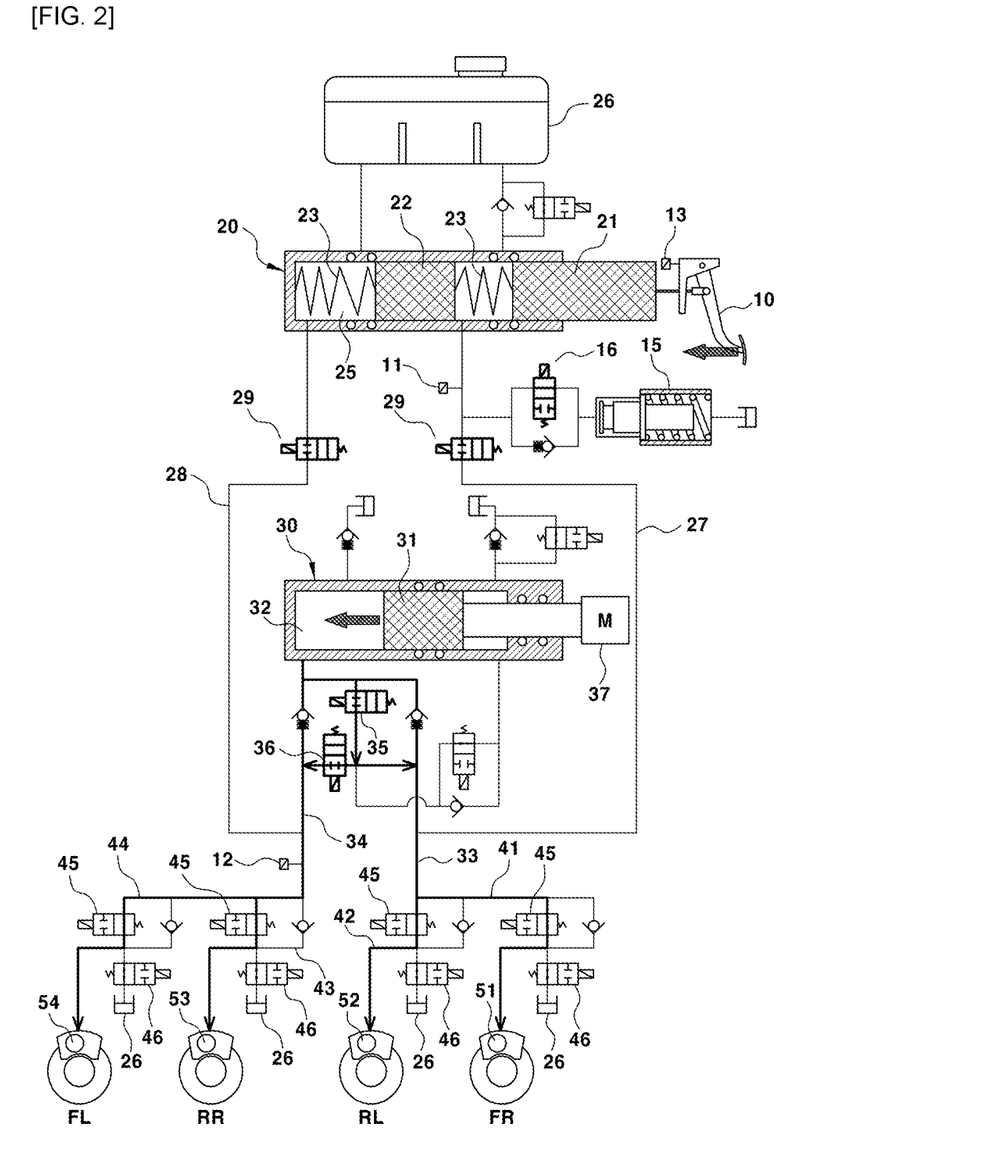
FIG. 2 is a diagram showing the electric booster type brake system, including the hydraulic circuit diagram in a state in which a driver steps on the brake pedal.

FIG. 2 is a hydraulic circuit diagram showing an electric booster type brake system, and shows a state in which a driver does not step on a brake pedal.

First, when the driver steps on the brake pedal 10, the pedal travel sensor 13 senses a pedal stroke at this time, and transmits the sensed signal to the controller 14.

Subsequently, the controller 14 controls the normal close (NC) type simulator valve 16 to be turned on, such that the simulator valve 16 is turned off.

Therefore, the main piston 21 in the first master cylinder 20 connected to the brake pedal 10 is pressed, and the hydraulic oil in the first hydraulic chamber 24 passes through the simulator valve 16 and is transmitted to the pedal simulator 15 and the reaction force of a damping part (a rubber damper and a spring) in the pedal simulator 15 is transmitted to the brake pedal 10 through the hydraulic oil, such that the driver stepping on the brake pedal 10 feels the braking feeling.

At this time, the normal open (NO) type cut valve 29, which is mounted on the third braking hydraulic supply line 27 and the fourth braking hydraulic supply line 28, by the control signal of the controller 14 is turned on to be in a closed state by, such that the hydraulic oil existing in each hydraulic chamber of the first master cylinder 20 is not transmitted to the wheel cylinder.

By doing so, when the driver steps on the brake pedal 10, the braking feeling is simulated, and the braking hydraulic pressure, i.e., the braking hydraulic pressure provided to the wheel cylinder is substantially generated by the power piston 31 of the second master cylinder 30.

More specifically, the motor 37 is driven by the control signal of the controller 14, and the normal close (NC) type relief valve 35 and balancing valve 36 are turned on to be open, the power piston 31 in the second master cylinder 30 is advanced by the driving of the motor 37 and the hydraulic oil in the hydraulic generation chamber 32 is pressed, the hydraulic pressure (pressed hydraulic oil) flows in the first braking hydraulic supply line 33 and the second braking hydraulic supply line 34, and the hydraulic pressure is branched into first to fourth braking hydraulic branch lines 41 to 44 to flow and then passes through a wheel inlet valve 45 in the normal open state to be supplied to each wheel cylinder 51 to 54, thereby performing the substantial braking.

Figure 3:
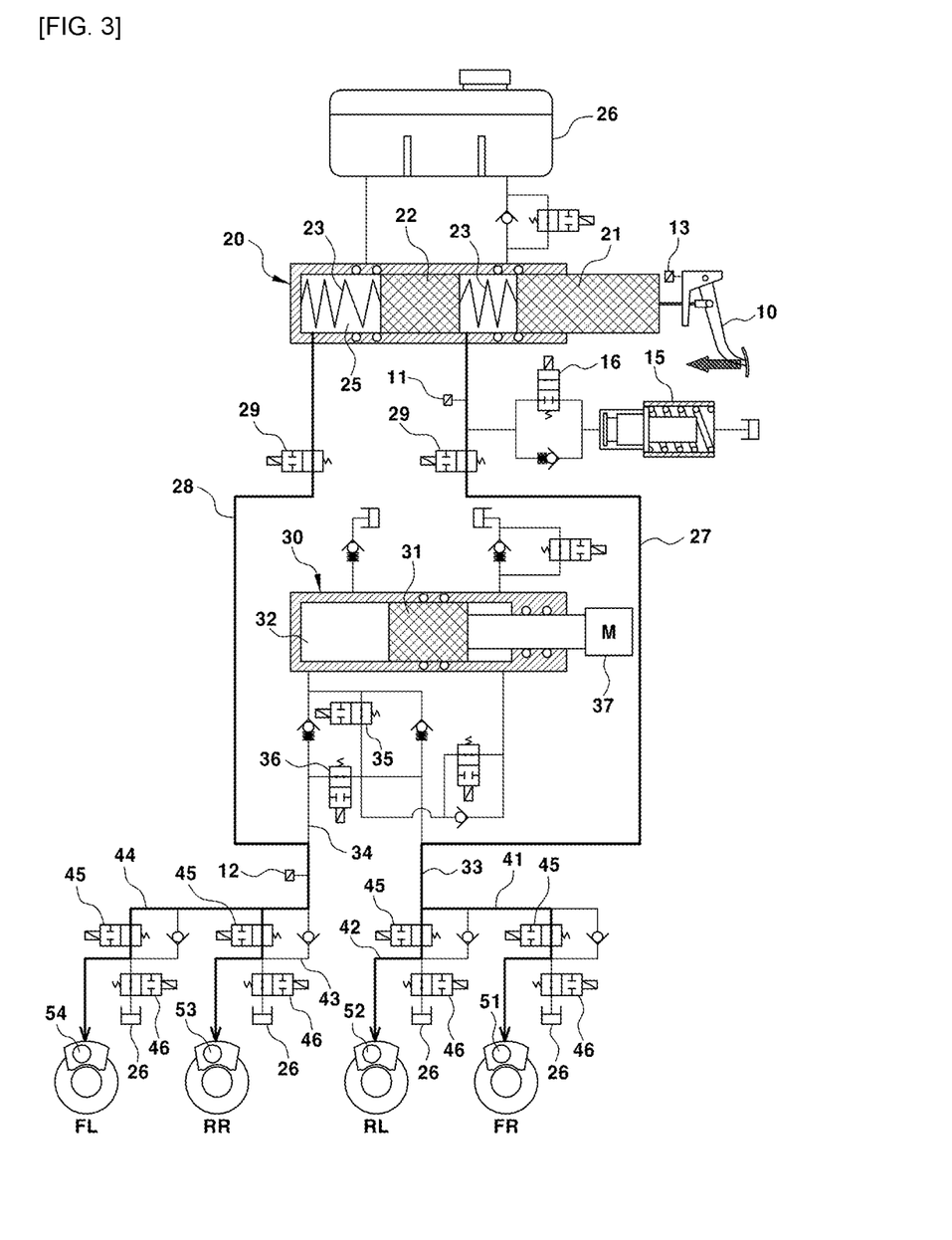
FIG. 3 is a diagram showing the electric booster type brake system, including the hydraulic circuit diagram in a fall back state.

FIG. 3 is a diagram showing the electric booster type brake system, and is the hydraulic circuit diagram in a fall back state.

The fall back situation refers to a situation in which the substantial braking force control by the driving of the motor as described above is not smooth or impossible due to a low voltage state of the battery supplying power to the motor, the motor damage, leakage of the hydraulic line, and the like.

If such a fall back situation occurs, the braking is made by the hydraulic pressure generated in the first master cylinder 20 when the driver steps on the brake pedal as a fail-safe phase for braking safety.

For example, when the controller 14 receives the battery voltage information from the battery controller and recognizes that the battery is in a low-voltage state, the controller 14 determines that the battery is in a fall back state, and performs a fall back mode that is a kind of fail-safe mode for braking safety.

At this time, when the controller 14 performs the fall back mode, the normal close (NC) type simulator valve 16, the normal open (NO) type cut valve 29, and the normal close (NC) type relief valve 35 and balancing valve 36 as described above are in a turn-off state as described in the following Table 1.

TABLE 1

| | | Operation | | |
| --- | --- | --- | --- | --- |
| Valve | | Before braking | Operation | |
| Valve Name | Valve Type | (Braking Ready) | upon braking (valve type) | Fall back mode |
| Simulator valve | NC | OFF | ON | OFF |
| Cut valve | NO | OFF | ON | OFF |
| Relief valve | NC | OFF | ON | OFF |
| Balancing valve | NC | OFF | ON | OFF |
| Wheel outlet valve | NC | OFF | OFF | OFF |
| Wheel inlet valve | NO | OFF | OFF | OFF |

In addition, when the controller 14 performs the fall back mode, the normal open (NO) type wheel inlet valve 45 and the normal close (NC) type wheel outlet valve 46 are also turned off as described in the above Table 1.

As shown in FIG. 3, the hydraulic pressure generated in the first master cylinder 20 is supplied to the wheel cylinders of each wheel when the driver steps on the brake pedal, such that the braking can be made.

On the other hand, if the fall back situation occurs while the driver steps on the brake pedal, the controller 14 performs the fall back mode from the next braking.

In addition, the fall back mode is immediately performed when the fall back situation occurs, such as when the battery is at an extremely low voltage (when a voltage of an electronic product such as a motor falls below an available voltage or the ECU itself is turned off).

Figure 4:
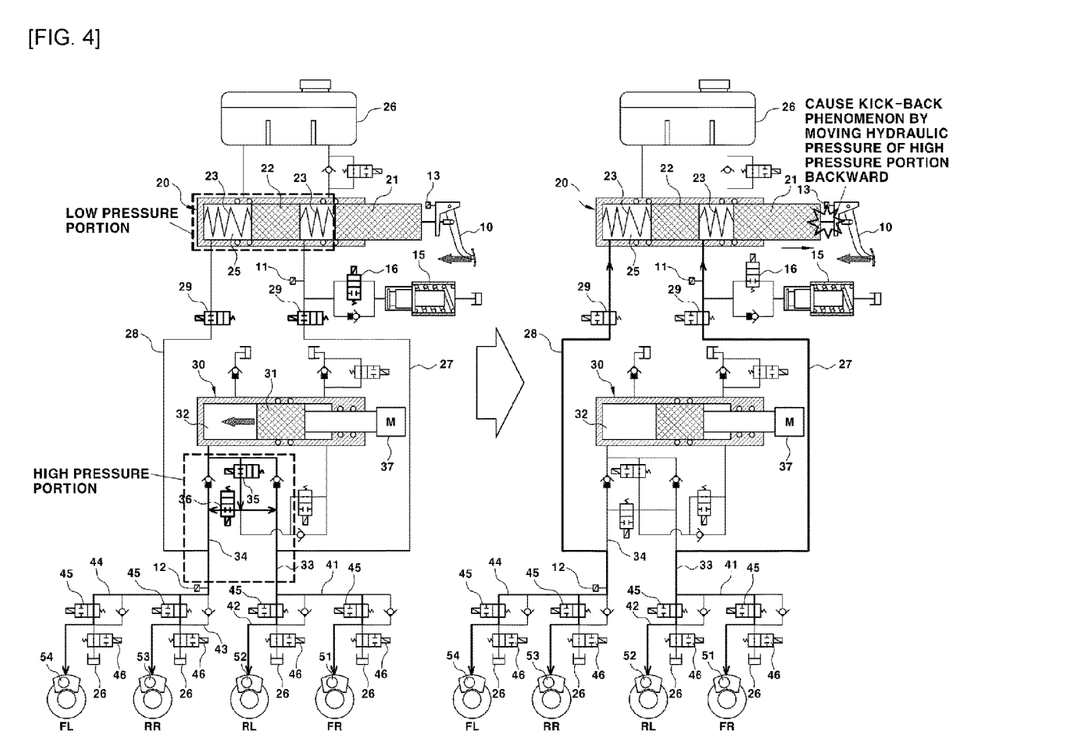
FIG. 4 is a diagram showing the electric booster type brake system, including the hydraulic circuit diagram indicating a situation in which a kick-back phenomenon occurs in the fall back state.

However, when the fall back situation occurs and the fall back mode is performed, as shown in FIG. 4, the kick-back phenomenon in which a hitting force is applied in a reverse direction (direction opposite to a direction in which the driver steps on the brake pedal) due to the difference between the hydraulic pressure (low pressure portion) generated in the first master cylinder 20 and supplied to each of the wheel cylinders 51 to 54 and the hydraulic pressure (high pressure portion) generated in advance by the power piston 31 of the second master cylinder 30 according to the driving of the motor 37 before the fall back mode is performed occurs, and the hitting force due to the kick-back phenomenon causes the driver to feel a sense of difference and anxiety.

The kick-back phenomenon can be inhibited in low-speed, deceleration, and stop situations in which braking of a vehicle is greatly not affected only by a manual brake force (a braking force generated by supplying the hydraulic pressure generated in the first master cylinder 20 to the wheel cylinders of each wheel when the driver steps on the brake pedal) in the fall back situation.

That is, in the low-speed, deceleration, and stop situations in which the braking of the vehicle is greatly not affected only by the manual brake force (a braking force generated by supplying the hydraulic pressure generated in the first master cylinder 20 to the wheel cylinders of each wheel when the driver steps on the brake pedal) in the fall back situation, the high hydraulic pressure generated in advance by the power piston may be discharged to the oil reservoir by the driving of the motor to greatly reduce the difference between the hydraulic pressure (low pressure portion) generated in the first master cylinder 20 and supplied to each of the wheel cylinders 51 to 54 and the hydraulic pressure (high pressure portion) generated in advance by the power piston 31 of the second master cylinder 30 according to the driving of the motor 37 before the fall back mode is performed, thereby reducing the above-mentioned kick-back phenomenon.

Hereinafter, a system and a method for controlling kick-back according to the present disclosure will be described.

Figure 6:
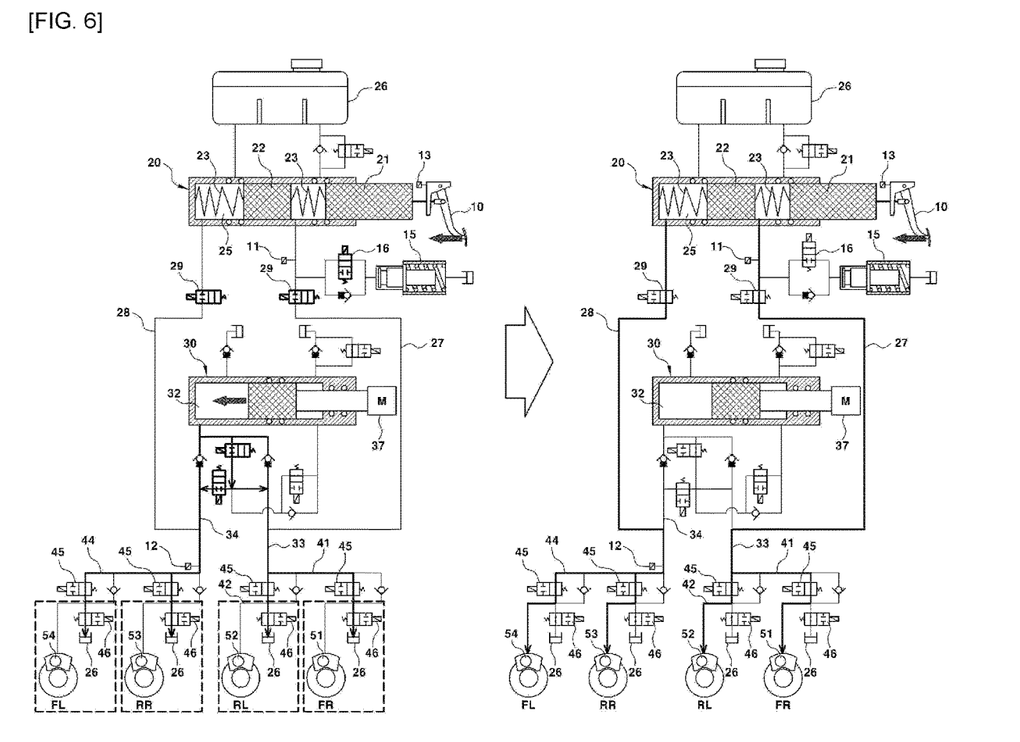
FIG. 6 is a hydraulic circuit diagram showing a state in which a kick-back is inhibited in an electric booster type brake system.
Figure 7:
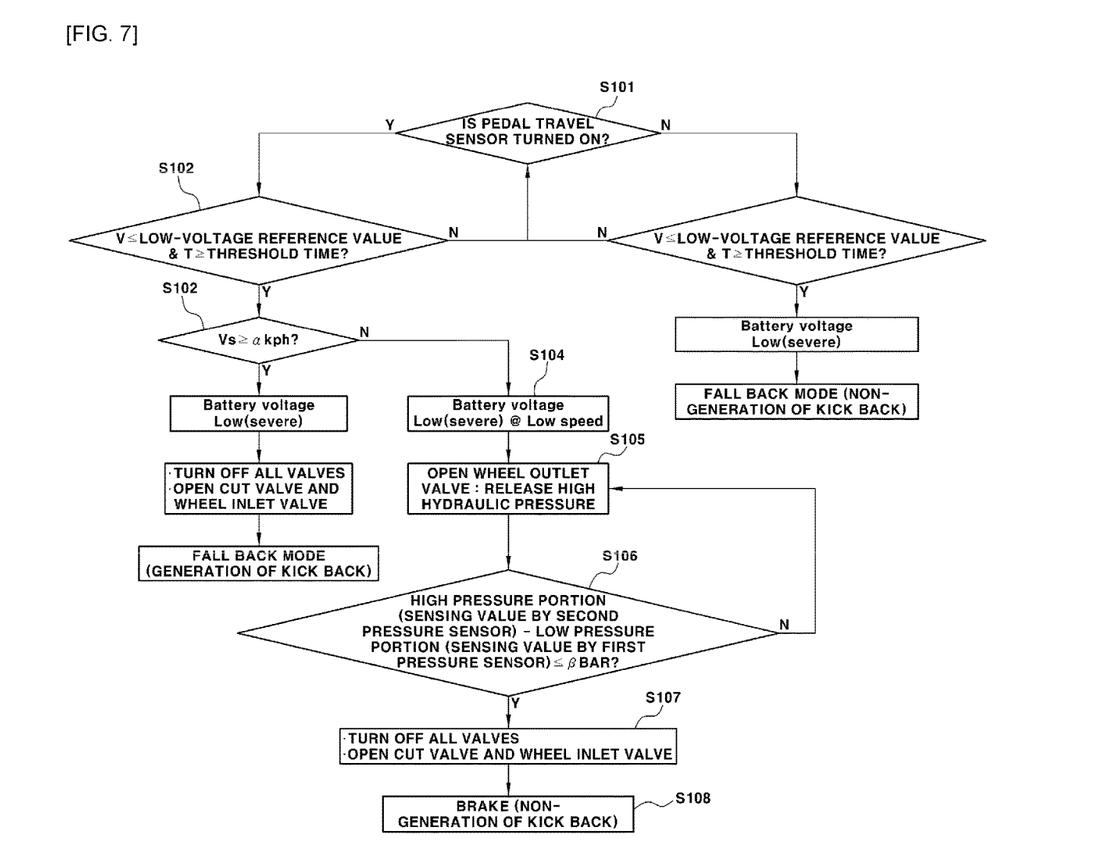
FIG. 7 is a flow chart showing a method for inhibiting a kick-back in the electric booster type brake system.

FIG. 5 is a control configuration diagram for the electric booster type brake system, FIG. 6 is a hydraulic circuit diagram showing a state in which the kick-back is inhibited in the electric booster type brake system according to the present disclosure, and FIG. 7 is a flowchart showing a method for inhibiting kick-back in an electric booster type brake system according to the present disclosure.

First, when the driver steps on the brake pedal to brake the vehicle, the pedal travel sensor 13 detects the pedal stroke (S101).

At this time, the controller 14 receives the sensing signal of the pedal travel sensor 13 and receives the current battery voltage information from the battery controller 18 in real time.

Subsequently, the controller 14 grasps the battery voltage level based on the battery voltage information transmitted from the battery controller and grasps whether the battery voltage is equal to or lower than the low-voltage reference value for the threshold time or longer.

Next, if it is determined that the battery voltage is equal to or lower than the low voltage reference value for the threshold time or longer, the controller 14 receives the sensing signal of the vehicle speed sensor 17 to grasp the current vehicle speed (S103).

At this time, the reason why the controller 14 grasps the current vehicle speed is to grasp the situation (low speed, deceleration, stop situations) in which the vehicle braking can be performed only by the hydraulic pressure generated in the first master cylinder 20 when the driver steps on the brake pedal.

Therefore, if the battery voltage in the controller 14 is equal to or lower than the low-voltage reference value for the threshold time or longer and the current vehicle speed is equal to or lower than the low-speed reference value α, the kick-back reduction mode is performed (S104).

According to the performance of the kick-back reduction mode by the controller 14, first of all, the normal close (NC) type wheel outlet valve 46 is turned on, such that the wheel outlet valve 46 is in the open state (S105).

In addition, the controller 14 controls the normal close type simulator valve 16, the normal open type cut valve 29, the normal close type relief valve 35, the normal close type balancing valve 36 to be turned on.

TABLE 2

| Valve | | | Operation | | |
|---|---|---|---|---|---|
| Valve Name | Valve Type | Before braking (Braking ready) | Operation upon braking (Valve type) | Fall back mode | Kick-back reduction mode |
| Simulator valve | NC | OFF | ON | OFF | ON (Open) |
| Cut valve | NO | OFF | ON | OFF | ON (Close) |
| Relief valve | NC | OFF | ON | OFF | ON (Open) |
| Balancing valve | NC | OFF | ON | OFF | ON (Open) |
| Wheel outlet valve | NC | OFF | OFF | OFF | ON (Open) |
| Wheel inlet valve | NO | OFF | OFF | OFF | OFF (Open) |

According to the performance of the kick-back reduction mode by the controller 14, as described in the kick-back reduction mode in the above Table 2, only the cut valve 29 is in the closed state, and the simulator valve 16, the wheel outlet valve 46, the relief valve 35, and the balancing valve 36 are in the open state.

Therefore, only the high hydraulic pressure generated in advance by the power piston 31 of the second master cylinder 30 can be discharged to the oil reservoir 26 while being transferred to the wheel cylinder.

Therefore, as shown in the left of FIG. 6, the high hydraulic pressure generated in advance by the power piston 31 of the second master cylinder 30 is discharged to the oil reservoir 26 through the relief valve 35, the balancing valve 36, the wheel outlet valve 46 by the driving of the motor 37 before the performance of the fall back mode.

Next, the controller 14 receives a signal of the first pressure sensing sensor 11 measuring the hydraulic pressure (hydraulic pressure generated in the first master cylinder 20) of the low pressure portion and the signal of the second pressure sensing sensor 12 measuring the hydraulic pressure (high hydraulic pressure generated in advance by the power piston 31 of the second master cylinder 30) of the high pressure portion to determine whether the difference between the hydraulic pressure of the high pressure portion and the hydraulic pressure of the low pressure portion is narrowed to be equal to or lower than a threshold value β (S106).

That is, as the high hydraulic pressure generated in advance by the power piston 31 of the second master cylinder 30 is discharged to the oil reservoir 26 through the wheel outlet valve 46 by the driving of the motor 37 before the fall back mode is performed as described above, the controller determines whether the difference between the hydraulic pressure of the high pressure portion and the hydraulic pressure of the low pressure portion is narrowed to be equal to or lower than the threshold value β.

Here, the threshold value β may be set to be in a range in which the kick-back does not occur even if the high hydraulic pressure is transmitted to the brake pedal.

Next, if it is determined that the difference between the hydraulic pressure of the high pressure portion and the hydraulic pressure of the low pressure portion is equal to or lower than the threshold value, the controller 14 performs the fall back mode (S107).

At this time, as described in the fall back mode by the performance of the fall back mode in the above Table 2 by the performance of the fall back mode of the controller 14, the cut valve 29, the simulator valve 16, the wheel outlet valve 46, the relief valve 35, and the balancing valve 36 are controlled to be turned off, such that only the cut valve 29 and the wheel inlet valve 45 are in the open state and the simulator valve 16, the wheel outlet valve 46, the relief valve 35, and the balancing valve 36 are in the closed state.

Accordingly, as shown in the right of FIG. 6, when the driver steps on the brake pedal, the hydraulic pressure generated in the first master cylinder 20 passes through the cut valve 29 and the wheel inlet valve 45 to be supplied to the wheel cylinders 51 to 54 of each wheel so as to brake the vehicle, and the hydraulic pressure of the high pressure portion is discharged to the oil reservoir 26 through the wheel outlet valve 46, thereby inhibiting the kick-back phenomenon from occurring (S108).

As described above, if the battery voltage is equal to or lower than the low-voltage reference value for the threshold time or longer and the current vehicle speed is equal to or lower than the low-speed reference value α, the difference between the hydraulic pressure of the high pressure portion and the hydraulic pressure of the low pressure portion is reduced by the performance of the kick-back reduction mode, such that the vehicle is easily braked only by the hydraulic pressure generated in the first master cylinder 20 when the driver steps on the brake pedal upon the actual fall back mode, thereby inhibiting the kick-back phenomenon from occurring.

In addition, although the present disclosure provides certain details, the protection scope of the present disclosure is not limited thereto. Therefore, various changes and improved forms by those skilled in the art using basic concepts of the present disclosure belongs to the protection scope of the present disclosure.

What is claimed is:

1. A system for controlling kick-back in an electric booster type brake system, comprising:
   a pedal travel sensor sensing a pedal stroke of a brake pedal and transmitting the sensed pedal stroke to a controller;
   a battery controller transmitting current battery voltage to a controller;
   a vehicle speed sensor transmitting the current vehicle speed information to the controller;
   a first pressure sensing sensor sensing a low hydraulic pressure generated in a first master cylinder;
   a second pressure sensing sensor sensing a high hydraulic pressure generated by driving of a power piston of a second master cylinder according to driving of a motor; and
   a controller configured to perform a kick-back reduction mode if a battery voltage is equal to or lower than a low-voltage reference value for a threshold time or longer and a current vehicle speed is equal to or lower than a low-speed reference value based on the battery voltage information and the vehicle speed information in a state in which the pedal stroke is sensed.

2. The system of claim 1, wherein the kick-back reduction mode of the controller controls a relief valve, a balancing valve, and a wheel outlet valve to be in an open state to discharge a high hydraulic pressure generated by the power piston of the second master cylinder according to the driving of the motor to discharge the high hydraulic pressure to an oil reservoir through the wheel outlet valve.

3. The system of claim 1, wherein the system further comprises:
   a cut valve configured to cut off the supply of the hydraulic pressure generated in the first master cylinder when the driver steps on the brake pedal to the wheel cylinder by the performance of the kick-back reduction mode of the controller.

4. The system of claim 1, wherein the controller is configured to stop performing the kick-back reduction mode and perform a fall back mode when a difference between a low hydraulic pressure sensed in the first pressure sensing sensor and a high hydraulic pressure sensed in the second pressure sensing sensor is equal to or lower than a threshold value.

5. The system of claim 4, wherein only a cut valve and a wheel inlet valve are controlled to be in an open state by the performance of the fall back mode of the controller, and a simulator valve, a wheel outlet valve, a relief valve, and a balancing valve are controlled to be in a closed state, so that the hydraulic pressure generated in the first master cylinder passes through the cut valve and the wheel inlet valve to be supplied to each wheel cylinder, thereby braking a vehicle.

6. A method for controlling kick-back in an electric booster type brake system, comprising:
   sensing, by a pedal travel sensor, a pedal stroke of a brake pedal and transmitting the sensed pedal stroke to a controller;
   transmitting current battery voltage information from a battery controller to a controller;
   transmitting current vehicle speed information from a vehicle speed sensor to the controller; and
   performing, by the controller, a kick-back reduction mode if a battery voltage is equal to or lower than a low-voltage reference value for a threshold time or longer and a current vehicle speed is equal to or lower than a low-speed reference value based on the battery voltage information and the vehicle speed information in a state in which the pedal stroke is sensed.

7. The method of claim 6, wherein the kick-back reduction mode of the controller includes:
   controlling a relief valve, a balancing valve, and a wheel outlet valve to be in an open state to discharge a high hydraulic pressure generated by a power piston of a second master cylinder according to driving of a motor; and passing the high hydraulic pressure through the wheel outlet valve to discharge the high hydraulic pressure to an oil reservoir.

8. The method of claim 7, wherein the method further comprises:

cutting off, by a cut valve, the supply of the hydraulic pressure generated in a first master cylinder when a driver steps on the brake pedal to the wheel cylinder upon performing the kick-back reduction mode of the controller is controlled to be in a closed state.

9. The method of claim 7, wherein the kick-back reduction mode of the controller further includes:

sensing, by a first pressure sensing sensor, a low hydraulic pressure generated in a first master cylinder;

sensing, by a second pressure sensing sensor, a high hydraulic pressure generated by driving of a power piston of a second master cylinder according to driving of a motor;

stopping performing the kick-back reduction mode when a difference between the low hydraulic pressure sensed by the first pressure sensing sensor and the high hydraulic pressure sensed by the second pressure sensing sensor is equal to or lower than a threshold value; and performing a fall back mode along with stopping performing the kick-back reduction mode.

10. The method of claim 9, wherein only a cut valve and a wheel inlet valve are controlled to be in an open state upon performing the fall back mode of the controller, and a simulator valve, a wheel outlet valve, a relief valve, and a balancing valve are controlled to be in a closed state, so that the hydraulic pressure generated in the first master cylinder passes through the cut valve and the wheel inlet valve to be supplied to each wheel cylinder, thereby braking a vehicle.

* * * * *